(12) United States Patent
Patel et al.

(10) Patent No.: US 9,237,098 B2
(45) Date of Patent: Jan. 12, 2016

(54) MEDIA ACCESS CONTROL (MAC) ADDRESS SUMMATION IN DATACENTER ETHERNET NETWORKING

(71) Applicant: Cisco Technology, Inc., San Jose, CA (US)

(72) Inventors: Amit Patel, Fremont, CA (US); Hemanth Basappa, San Jose, CA (US)

(73) Assignee: Cisco Technologies, Inc., San Jose, CA (US)

( * ) Notice: Subject to any disclaimer, the term of this patent is extended or adjusted under 35 U.S.C. 154(b) by 271 days.

(21) Appl. No.: 13/930,126

(22) Filed: Jun. 28, 2013

(65) Prior Publication Data

US 2014/0010234 A1    Jan. 9, 2014

Related U.S. Application Data

(60) Provisional application No. 61/667,570, filed on Jul. 3, 2012.

(51) Int. Cl.
*H04L 12/28*    (2006.01)
*H04J 3/16*    (2006.01)
*H04L 12/741*    (2013.01)
*H04L 12/721*    (2013.01)

(52) U.S. Cl.
CPC ............... *H04L 45/74* (2013.01); *H04L 45/66* (2013.01)

(58) Field of Classification Search
USPC ........................................................ 370/392
See application file for complete search history.

(56) References Cited

U.S. PATENT DOCUMENTS 6,473,421 B1    10/2002  Tappan
8,369,335 B2 *  2/2013  Jha et al. ................ 370/392
2011/0007741 A1 *  1/2011  Kreeger et al. ............... 370/389

OTHER PUBLICATIONS

Cisco, "Cisco FabricPath for Cisco Nexus 7000 Series Switches," Cisco White Paper, Version 1.0, Sep. 7, 2011, pp. 1-44.

* cited by examiner

*Primary Examiner* — Edan Orgad
*Assistant Examiner* — Sithu Ko
(74) *Attorney, Agent, or Firm* — Edell, Shapiro & Finnan, LLC

(57) ABSTRACT

Techniques are presented to summarize the Media Access Control (MAC) addresses behind a single edge port so that the Datacenter Ethernet edge devices do not learn the MAC addresses of individual end hosts connected to the Datacenter Ethernet network. At a line card of an Ethernet networking device connected to a DCE network, information is generated that summarizes Media Access Control (MAC) addresses of remote hosts reachable through a Datacenter Ethernet networking device of the Datacenter Ethernet network. A packet is received at the Ethernet networking device, wherein the packet is directed to one of the remote hosts. The packet is forwarded to one of the remote hosts using the information summarizing the MAC addresses of the remote hosts.

20 Claims, 5 Drawing Sheets

MEDIA ACCESS CONTROL (MAC) ADDRESS SUMMATION IN DATACENTER ETHERNET NETWORKING

CROSS-REFERENCE TO RELATED APPLICATIONS

This application claims priority to U.S. Provisional Patent Application No. 61/667,570, entitled "Media Access Control (MAC) Address Summation in Datacenter Ethernet (DCE)," and filed on Jul. 3, 2012. The above application is hereby incorporated by reference herein.

TECHNICAL FIELD

The present disclosure relates generally to data center networks.

BACKGROUND

Datacenter Ethernet (DCE) is an architectural collection of Ethernet extensions designed to improve Ethernet networking and management in a data center. Multipathing and full bisectional bandwidth are some of the advantages offered by DCE. Cisco System's FabricPath (FP) technology and the Internet Engineering Task Force (IETF) Transparent Interconnect of Lots of Links (TRILL) standard are examples of the deployed DCE technologies.

DESCRIPTION OF EXAMPLE EMBODIMENTS

Overview

Figure 1:
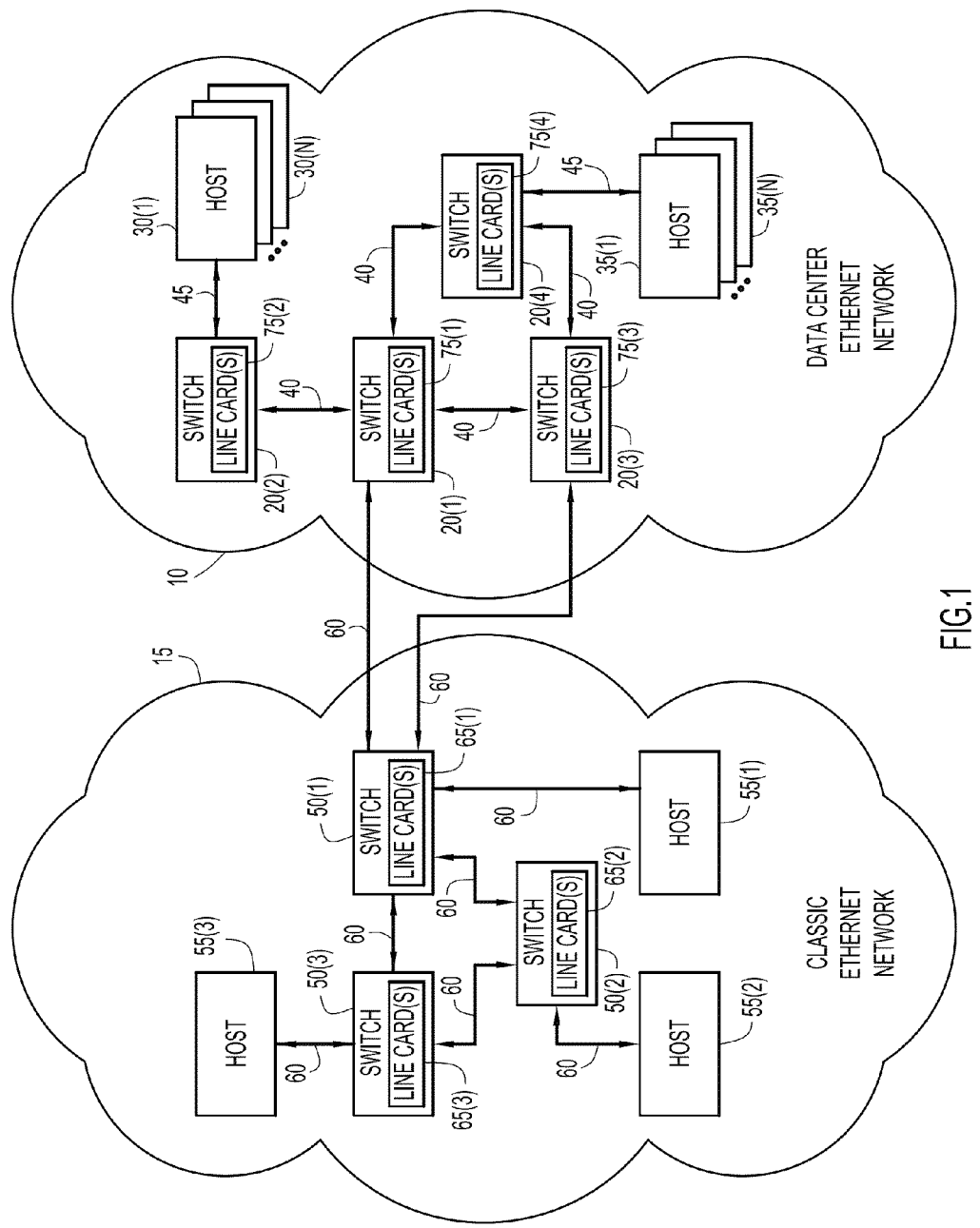
FIG. 1 is a block diagram of an example Datacenter Ethernet (DCE) network configured to interoperate with a classical Ethernet network.

Techniques are presented herein for a forwarding scheme for traffic originating from legacy or classical Ethernet (CE) devices connected to a Datacenter Ethernet (DCE) network executing multipathing and Mac-in-Mac (MiM) based hierarchical forwarding. At a line card of an Ethernet networking device connected to a DCE network, information is generated that summarizes Media Access Control (MAC) addresses of remote hosts reachable through a Datacenter Ethernet networking device of the Datacenter Ethernet network. A packet is received at the Ethernet networking device, wherein the packet is directed to one of the remote hosts. The packet is forwarded to one of the remote hosts using the information summarizing the MAC addresses of the remote hosts.

Example Embodiments

Computer networks are used to interconnect hosts (e.g., computers, servers, virtual machines, mobile devices, etc.) so that the hosts may exchange data and share resources. Ethernet is the most well-known physical and data link layer technology that is used for local area networks (LANs) where a source host will transmit an Ethernet "frame" to a destination host via one or more networking devices (e.g., switches). In so-called legacy or classical Ethernet networks, an Ethernet frame includes both a destination address and a source address, which identify the recipient and the sender of the frame, respectively. These addresses are generally Media Access Control (MAC) addresses that are used by the network devices to forward the frame to the correct destination.

As computer networks have increased in speed and complexity, the classical Ethernet standard has expanded to encompass new networking technologies and features. One such expansion of the classical Ethernet standard is Datacenter Ethernet (DCE). Certain Datacenter Ethernet networks, such as Cisco System's FabricPath technology, implement a forwarding paradigm that uses Layer 2 (L2) multipathing and Mac-in-Mac (MiM) based hierarchical addressing to provide a highly scalable network. The use of hierarchical forwarding enables Datacenter Ethernet networks to support a larger number of switches/devices (i.e., support a larger L2 domain) while remaining more scalable than classical Ethernet networks. In such Datacenter Ethernet networks, the hierarchical addressing to forward frames relies on use of a switch identifier (SWID.SSID) to identify the destination host. Unlike MAC addresses in classical Ethernet that uniquely identifier the source/destination hosts, this switch identifier identifies (i.e., corresponds to) the switch that connects the DCE network to the destination host.

In a Datacenter Ethernet network, when a frame is sent to a destination host, the frame is encapsulated using the MiM format where the Ethernet frame is encapsulated with a Service Provider MAC header. After this MiM encapsulation, the encapsulated frame is sent out towards the destination switch over the Datacenter Ethernet network. Once the frame reaches the destination switch (i.e., the switch connected to the destination host), the destination switch will send the frame out to the final destination host attached to that switch. With this model, the core networking devices (e.g., switches) of the Datacenter Ethernet network do not learn individual MAC addresses for the end hosts. This allows the Datacenter Ethernet core to be highly scalable as none of the end hosts are visible in the core.

As noted above, the networking devices in classical Ethernet networks rely on the destination/source host MAC addresses to forward packets to the correct destination. However, the networking devices in Datacenter Ethernet networks do not use MAC addresses for frame forwarding, but instead use a switch identifier so that the MAC addresses remain hidden. Because Datacenter Ethernet is an emerging technology, it is possible (and likely) that Datacenter Ethernet networks and classical Ethernet networks will interoperate with one another.

In such arrangements where a Datacenter Ethernet network and a classical Ethernet network interoperate, when a host is connected to the Datacenter Ethernet network via a networking device that does not support Datacenter Ethernet network results in the Datacenter Ethernet network, the edge device will learn the MAC addresses for all hosts behind the Datacenter Ethernet network. That is, to allow the classical Ethernet and Datacenter Ethernet networks to interoperate with each other, conventional mechanisms expose the MAC addresses of the individual end hosts connected to the Datacenter Ethernet network. However, this may be problematic as the Datacenter Ethernet networking devices (e.g., the device Application Specific Integrated Circuits (ASICs)) are designed with smaller MAC tables since the Datacenter Ethernet network core ports do not learn MAC address in order to perform hierarchical forwarding. The techniques proposed herein summarize the MAC addresses behind a single edge port so that the Datacenter Ethernet edge devices do not learn the MAC addresses of the individual end hosts connected to the Datacenter Ethernet network. These MAC summarization techniques can be used with existing hardware and lookups already available in current generation ASICs. This allows Datacenter Ethernet networks to scale to potentially large number of end hosts even when they are connected via classical Ethernet devices not supporting Datacenter Ethernet.

FIG. 1 is a block diagram of a Datacenter Ethernet network 10 that is connected to a classical Ethernet network 15. The Datacenter Ethernet network 10 of FIG. 1 comprises, in this example, four networking device (switches) 20(1)-20(4), a first plurality of hosts 30(1)-30(N), and a second plurality of hosts 35(1)-35(N). The switches 20(1)-20(4) are interconnected by Datacenter Ethernet links 40 and are configured to perform Datacenter Ethernet networking operations. As such, the switches 20(1)-20(4) are sometimes referred to herein as DCE switches. The switches 20(2) and 20(4) are connected to hosts 30(1)-30(N) and 35(1)-35(N), respectively, via links 45. Links 45 may comprise, for example, Enhanced Ethernet links, Datacenter Ethernet links with portal enhancements, etc.

In the example of FIG. 1, the classical Ethernet network 15 comprises three networking devices (switches) 50(1), 50(2), and 50(3) and three hosts 55(1), 55(2), and 55(3). The switches 50(1), 50(2), and 50(3) are interconnected by classical Ethernet links 60, while hosts 55(1), 55(2), and 55(3) are also connected to switches 50(1), 50(2) and 50(3), respectively, by classical Ethernet links 60. Similarly, the classical Ethernet network 15 is connected to the Datacenter Ethernet network 10 by classical Ethernet links 60. That is, in this example, switch 50(1) is connected to switches 20(1) and 20(3) by classical Ethernet links 60. The switches 50(1), 50(2), and 50(3) are configured to perform classical Ethernet networking operations and are sometimes referred to herein as CE switches.

Frames enter a switch through an ingress line card and are forwarded to an egress line card via one or more switch cards. Line cards generally include, for example, network interface ports, processor(s), memory, and interfaces with the switch cards. The switch cards provide a switch fabric (i.e., hardware switching element) and may also include processor(s), memory, interfaces, etc. In the example of FIG. 1, switches 50(1), 50(2), and 50(3) each include one or more line card(s) 65(1), 65(2), and 65(3), respectively, which are unable to learn a switch identifier (i.e., line cards designed only for classical Ethernet). Such line cards are referred to herein as CE line cards 65(1), 65(2), and 65(3). Also in the example of FIG. 1, switches 20(1)-20(4) include one or more line cards 75(1)-75(4), respectively, that are able to learn a switch identifier (i.e., line cards designed for Datacenter Ethernet). Such line cards are referred to herein as Datacenter Ethernet or DCE line cards 75(1)-75(4).

An end host connected to a CE line card may communicate with a remote host connected behind a Datacenter Ethernet network. However, in conventional arrangements, such communication occurs via a proxy forwarding mechanism executed by another line card that is able to learn the switch identifier. The line cards that are able to learn switch identifiers are the DCE line cards. More specifically, in conventional arrangements, packets originating from a CE line card are forwarded via a classical Ethernet-Datacenter Ethernet (CE-DCE) proxy forwarding function (executed by the DCE line card) before the frames can be put on the Datacenter Ethernet network. That is, a DCE line card connected to the Datacenter Ethernet network core performs the proxy-forwarding functionality for traffic originating from a CE line card. Furthermore, in these conventional arrangements, in order for the DCE line card to correctly encapsulate the proxy packets using the MiM format, the DCE line card first learns the MAC addresses of the end hosts connected behind the Datacenter Ethernet network. The DCE line card obtains, among other information, the switch identifier for the end hosts in the FP network.

CE line cards generate forwarding index information, referred to as "IF_INDEX," which corresponds to a remote Datacenter Ethernet enabled switch where a destination host is connected. This specific IF_INDEX is used on the egress of the DCE line card to derive the MiM encapsulation and send the frame out to the switch and the destination host. In certain examples, the IF_INDEX is a 32-bit number that includes 8 bits defining the type of interface, 5 bits indicating the physical slot number (only 32 possible) 7 bits indicating the physical port number (only 128 possible) and 12 bits indicating sub-interfaces (4000 possible).

In FIG. 1, host 55(1) is connected to a CE line card 65(1) at switch 50(1) and host 35(1) is the remote destination host connected to switch 20(4). In conventional techniques, in order to perform MAC Lookup during MiM encapsulation of frames originating from CE line cards 65(1)-65(3), the DCE line cards 75(1)-75(3) are currently configured to learn the MAC address of the hosts connected to the Datacenter Ethernet network 10. This allows the frames leaving from switch 50(1) to have the correct switch identifier so as to flow from host 55(1) to host 35(1). However, in this approach, the core ports on the switches learn the MAC addresses for any traffic passing there through. Because the switches are only able to learn and store a limited number of MAC addresses (e.g., 16,000 MAC addresses in certain arrangements), the number of network devices that may be used within the network are limited when a CE line card is present. Accordingly, this restricts Datacenter Ethernet deployments in the aggregation layer where a typical L2-L3 boundary is combined within a single box.

In order to solve this problem, the techniques presented herein use MAC address aggregation (summation) for switches connected to a Datacenter Ethernet network so that the DCE line cards do not have to learn the MAC address of all hosts behind the Datacenter Ethernet network. In case of FIG. 1, the CE switches 50(1)-50(3) can be assigned a summarized switch identifier that functions as an aggregation mechanism to summarize the MAC addresses behind the remote DCE switches 20(1)-20(4). For example, on switch 50(1), the CE line card 65(1) uses an internal port-channel interface to learn the MAC addresses of remote hosts 30(1)-30(N) and 35(1)-35(N) behind the Datacenter Ethernet network 10. The internal port-channel interface, sometimes referred to as the gateway port-channel interface, is a path for CE line cards to communicate with any host behind a remote switch through DCE line cards without having to remember that a host is behind a remote switch-id.

This allows the CE line card 65(1) on switch 50(1) to encapsulate packets with a switch identifier (SWID.SSID) and send the frame out to switch 20(1). That is, on the CE line card, an internal port-channel interface is created for each switch identifier of the Datacenter Ethernet network. CE line cards send packets to this internal port-channel interface and an IF_INDEX is modified according to a reference table. The MAC addresses are learned on CE line cards pointing to an IF_INDEX corresponding to a remote switch identifier. On receiving this frame, switch 20(1) will use the switch identifier information to send the frame out to a specific port to forward it to the end destination.

Any return traffic destined to the source MAC address coming from remote switch will be sent to the IF_INDEX that was obtained from the reference table. On egress of the DCE line card, based on destination of the packet corresponding to this IF_INDEX, a table is used to determine the remote switch-identifier and to forward the packet with this switch-identifier encapsulated in the packet. With this optimization, switch 20(1) no longer learns the MAC addresses for hosts behind switches 20(2) and 20(4), thereby allowing the MAC learning to scale proportionally to the number of CE switches in the network, rather than scale with the number of end hosts behind these switches.

Figure 2:
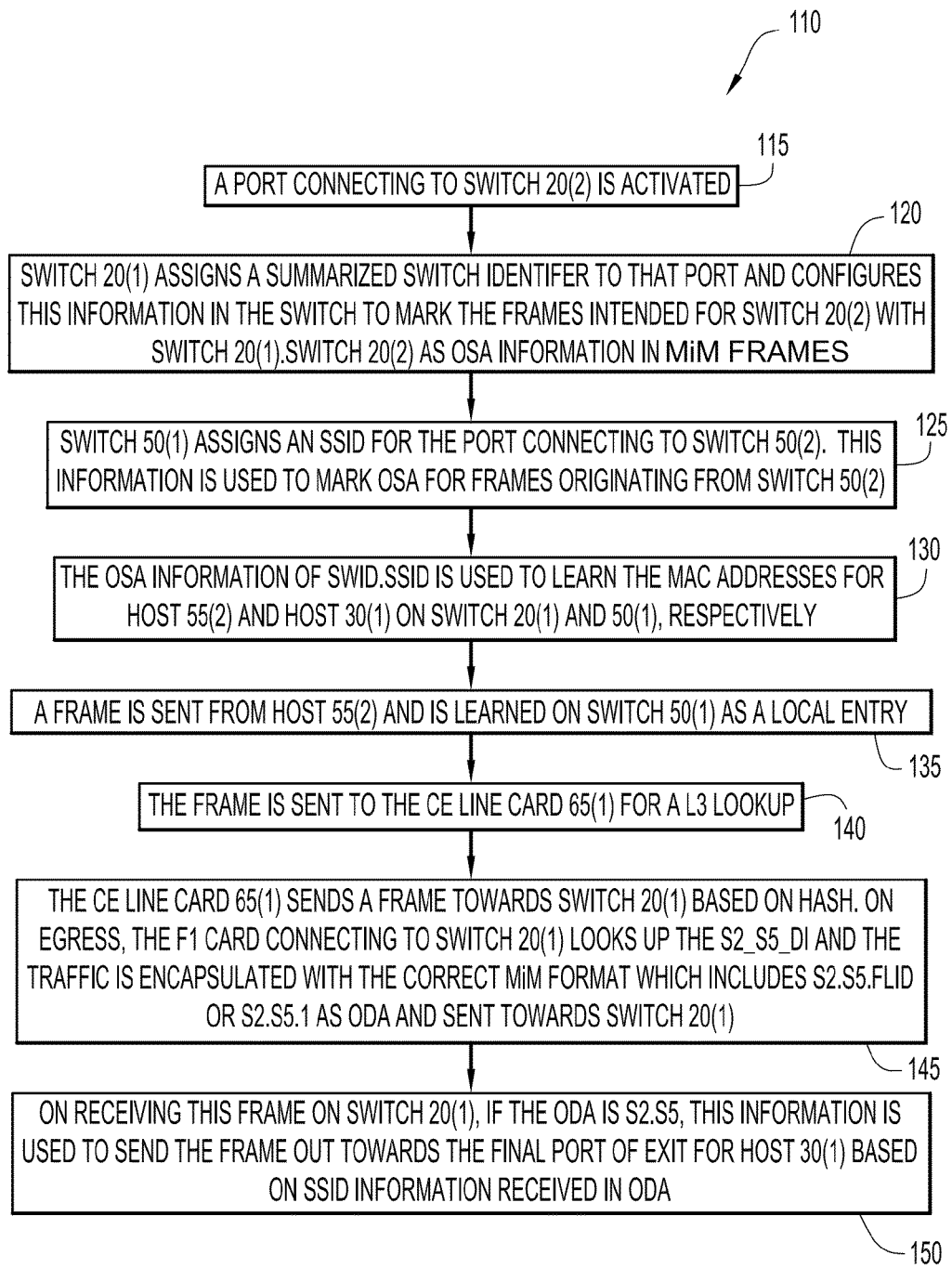
FIG. 2 is a flowchart of a method in accordance with examples presented herein.

FIG. 2 is a flowchart illustrating a method 110 in accordance with one example of FIG. 1 in which frames are transmitted from host 55(2) to host 30(1). Method 110 begins at 115 where a port connecting to switch 20(2) is activated (brought up). At 120, switch 20(1) assigns a summary switch identifier (SSID) to that port. The switch 20(1) also configures this information in the switch to mark the frames intended for switch 20(2) with Outer Source Address (OSA) information (e.g., switch 20(1).switch 20(2) as OSA information in MiM frames). In FabricPath technology, each packet is encapsulated with a MiM header containing information of switches from where the packet originated (OSA=Outer Source Address=Switch-id.Sub-Switch-id.If-index) and where it is destined to (ODA=Outer Destination Address=Switch-id.Sub-Switch-id.If-index).

At 125, switch 50(1) assigns a summary switch identifier for the port connecting to switch 50(2). This information is used to mark OSA for frames originating from switch 50(2). At 130, the OSA information of SWID.SSID is used to learn the MAC addresses for host 55(2) and host 30(1) on switch 20(1) and 50(1), respectively.

At 135, a frame is sent from host 55(2) and is learned on switch 50(1) as a local entry. That is, the source MAC address of the packet is learned. The local entry implies that the MAC entry is hanging behind a Spanning Tree Edge port and it is local to the forwarding engine on which the MAC address is present Since hosts 55(2) and 30(1) are connected via L3, at 140, the frame is sent to the CE line card 65(1) to do a L3 lookup. The L3 lookup will result in L2 adjacency which for host 30(1) is learned on the line card 65(1) with internal port-channel interface corresponding to switch 20(2). On the CE line card, the packet gets routed from one interface to an L2 interface. Post routing, hardware performs MAC table lookup on the CE line card to forward the packet.

At 145, the CE line card 65(1) sends a frame towards switch 20(1) based on hash. On egress, the DCE card connecting to switch 20(1) looks up the internal-port channel interface and the traffic is encapsulated with the correct MiM format. The ODA is encapsulated in the SWID.SSWID based on the internal port-channel reference in the "Di2swid" table on egress of DCE card. This is frame is sent towards switch 20(1).

At 150, upon receiving this frame on switch 20(1), if the ODA has a local SWID, the frame is sent out towards the final port of exit for host 30(1) based on SSID information received in ODA.

With the above optimizations, individual MAC addresses are no longer copied on the Datacenter Ethernet core ports. Internal port-channels (gateway port-channel interfaces) corresponding to remote switches in the Datacenter network (e.g., switches 20(2) and 20(4) in FIG. 1) can be created, for example, via overlay protocols when switches 20(2) and 20(4) are brought up or when switch 50(1) actually detects an entry that is learned for S1.S5 in its MAC table.

Figure 3:
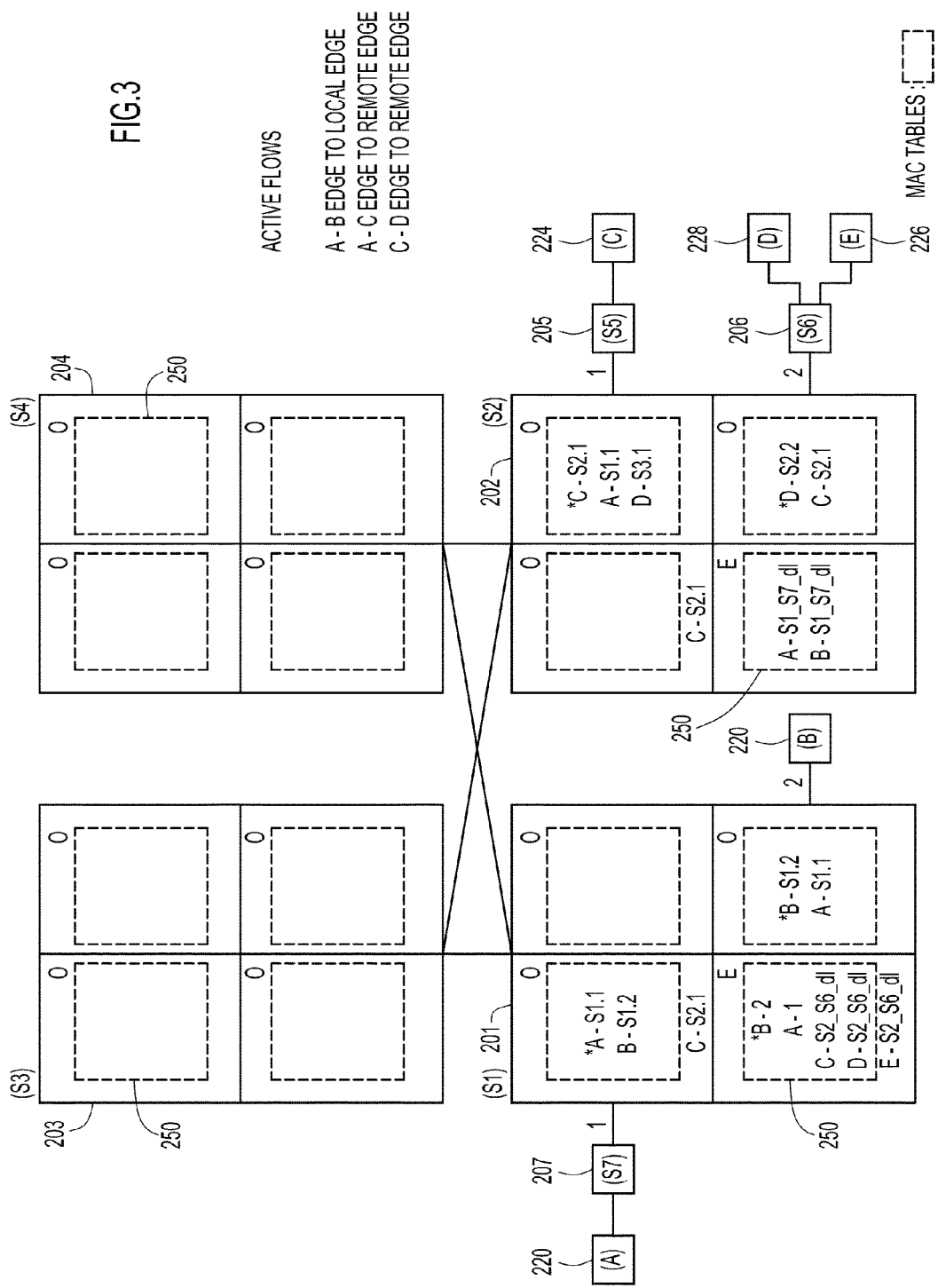
FIG. 3 is a block diagram of an example arrangement in accordance with examples presented herein.

FIG. 3 illustrates another example arrangement involving switch 201 (S1), switch 202 (S2), switch 203 (S3), switch 204 (S4), switch 205 (S5), switch 206 (S6), and switch 207 (S7). The arrangement of FIG. 3 also involves hosts 220 (A), 222 (B), 224 (C), 226 (D), and 228 (E). The switches S1-S7 each include one or more MAC tables 250. In this example, when a port connecting to S5 is brought up, switch S2 assigns an SSID to that port and configures this information in S2 to mark the frames arriving for S5 with S2.S5 as OSA information in MiM frames.

Similarly, S1 assigns an SSID for the port connecting S7. This information is used to mark OSA for frames originating from S7. This OSA information of SWID.SSID is used to learn the MAC addresses for host A and host C on switch S2 and S1, respectively.

A frame is sent from host A and is learned on S1 as a local entry. Since A and B are connected via L3, the frame is sent to the CE card to do a L3 lookup. L3 lookup will result in L2 adjacency which for host C is learned on the CE card with internal port-channel of "S2_S5_DI" corresponding to S2. The CE card sends a frame towards S2 based on a hash. On egress, the DCE card connecting to S2 looks up "S2_S5_DI" and the traffic is encapsulated with the correct MiM format which includes S2.S5.FLID or S2.S5.1 as ODA and sent towards S2. Upon receiving this frame on S2, if the ODA is S2.S5, this information is used to send the frame out towards the final port of exit for host C based on SSID information received in ODA.

Using the optimization depicted in FIG. 3, individual MAC addresses are no longer copied on the DCE core ports. Internal port-channel interfaces corresponding to remote switches S5 and S6 can be created, for example, via an overlay protocol when S5,S6 are brought up or when S1 actually detects an entry that is learned for S1.S5 in its MAC table.

Presented herein are techniques for MAC address summarization in a Datacenter Ethernet network (e.g., an FP network) for interoperation with classical Ethernet devices not supporting Datacenter Ethernet. The techniques described herein may be implemented in one or more application specific integrated circuits (ASICs) in digital logic gates or by a processor that executes instructions stored in a tangible (non-transitory) processor readable memory storage media, e.g., Read Only Memory (ROM), Random Access Memory (RAM) or other non-transitory memory storage device. For example, FIG. 4 is a block diagram of a networking device 280 configured to use summarized MAC addresses behind a single edge port so that a Datacenter Ethernet edge device does not learn the MAC addresses of individual end hosts connected to the Datacenter Ethernet network.

Figure 4:
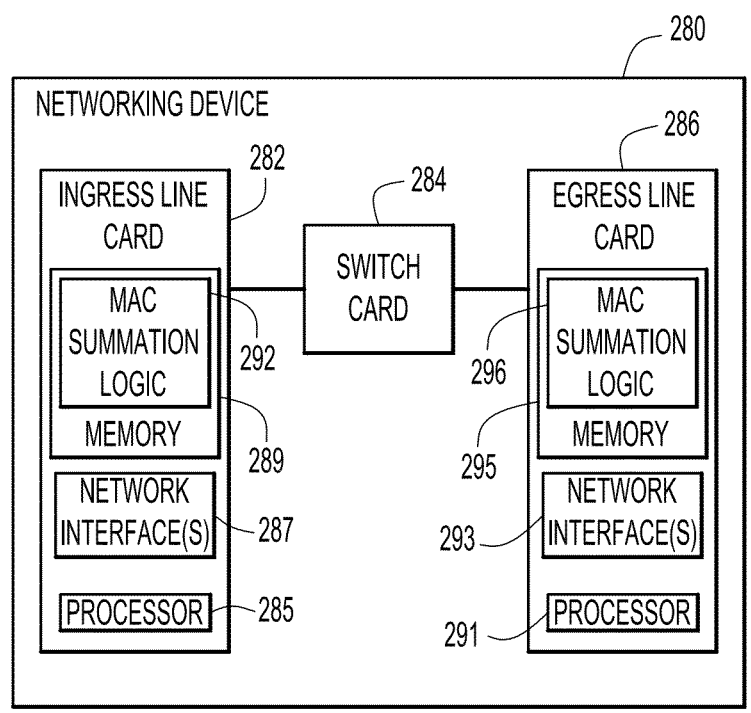
FIG. 4 is a block diagram of an example networking device in accordance with examples presented herein.

More specifically, the networking device 280 of FIG. 4 comprises an ingress line card 282, a switch card 284, and an egress line card 286. Line card 282 may include, for example, network interface(s) 287, a processor 285, and a memory 289 comprising MAC summation logic 292. Line card 286 may include, for example, network interface(s) 293, a processor 291, and a memory 295 comprising MAC summation logic 296. The switch card 284 provides a switch fabric (i.e., hardware switching element). The MAC summation 292 and 296 are configured to enable the line cards 282 and 286 to perform the MAC summation techniques described herein (i.e., to enable networking device 280 to use summarized MAC addresses behind a single edge port so that a Datacenter Ethernet edge device does not learn the MAC addresses of individual end hosts connected to the Datacenter Ethernet network). The MAC summation logic 292 and 296 may be implemented in software (as shown) or may be implemented in hardware or a combination of hardware/software.

Figure 5:
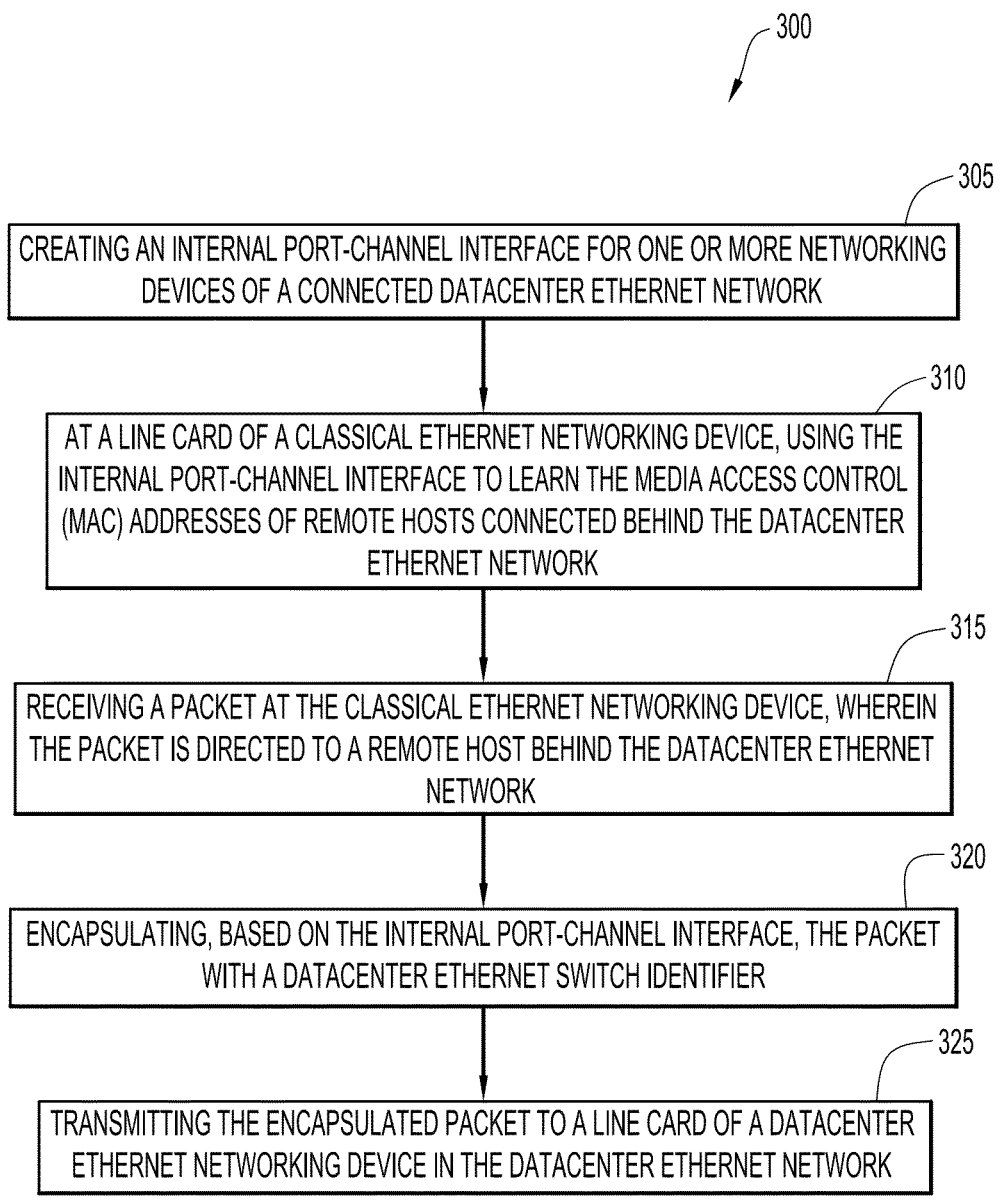
FIG. 5 is a flowchart of a method in accordance with examples presented herein.

FIG. 5 is a high-level flowchart of a method 300 in accordance with examples presented herein. Method 300 begins at 305 where an internal port-channel interface is created for one or more networking devices of a connected Datacenter Ethernet network. At 310, a line card of a classical Ethernet networking device connected to the Datacenter Ethernet network uses the internal port-channel interface to learn the MAC addresses of remote hosts connected behind the Datacenter Ethernet network. At 315, a packet is received at the line card, where the packet is directed to a remote host behind the Datacenter Ethernet network. At 320, the packet is encapsulated, based on the internal port-channel interface, a Datacenter Ethernet switch identifier. At 325, the encapsulated packet is transmitted to a line card of a Datacenter Ethernet networking device in the Datacenter Ethernet network.

The above description is intended by way of example only.

What is claimed is:

1. A method comprising:
at a line card of an Ethernet networking device connected to an edge of a Datacenter Ethernet network, learning the Media Access Control (MAC) addresses of a plurality of remote hosts reachable through a Datacenter Ethernet networking device of the Datacenter Ethernet network;
generating a summarized switch identifier corresponding to the plurality of MAC addresses of the plurality of remote hosts reachable through the Datacenter Ethernet networking device of the Datacenter Ethernet network;
receiving a packet at the Ethernet networking device, wherein the packet is directed to one of the plurality of remote hosts reachable through the Datacenter Ethernet networking device;
encapsulating the packet with the summarized switch identifier; and
sending the packet encapsulated with the summarized switch identifier to the Datacenter Ethernet network for forwarding to the one of the plurality of remote hosts using the summarized switch identifier.

2. The method of claim 1, wherein generating the summarized switch identifier for the plurality of remote hosts comprises:
creating an internal port-channel interface for one or more Datacenter Ethernet network networking devices of the Datacenter Ethernet network; and
using the internal port-channel interface to learn the MAC addresses of the plurality of remote hosts.

3. The method of claim 2, further comprising:
upon receipt of the packet at the Ethernet networking device, encapsulating, based on the internal port-channel interface, the packet with the summarized switch identifier; and
sending the packet encapsulated with the summarized switch identifier to a line card of the Datacenter Ethernet networking device in the Datacenter Ethernet network.

4. The method of claim 3, further comprising:
learning the MAC addresses of a plurality of different groups of remote hosts each reachable through a different Datacenter Ethernet networking device of the Datacenter Ethernet network;
generating a summarized switch identifier for each of the different group of remote hosts, wherein each summarized switch identifier corresponds to the plurality of MAC addresses of the remote hosts reachable through the respective different Datacenter Ethernet networking device; and
creating an internal port-channel interface for each summarized switch identifier in the Datacenter Ethernet network.

5. The method of claim 1, further comprising:
encapsulating the packet with the summarized switch identifier without the use of a proxy forwarding mechanism executed at a Datacenter Ethernet line card that is able to learn the summarized switch identifier.

6. The method of claim 1, further comprising:
sending the packet encapsulated with the summarized switch identifier to a line card of a Datacenter Ethernet networking device that does not learn the MAC addresses of the plurality of remote hosts connected behind the Datacenter Ethernet network.

7. The method of claim 1, wherein receiving the packet comprises:
receiving the packet at a line card that is unable to learn switch identifiers used for forwarding in the Datacenter Ethernet network.

8. An apparatus comprising:
an Ethernet line card comprising one or more network interfaces connected to an edge of a Datacenter Ethernet network;
a memory; and
a processor configured to:
learn the Media Access Control (MAC) addresses of a plurality of remote hosts reachable through a Datacenter Ethernet networking device of the Datacenter Ethernet network;
generate a summarized switch identifier corresponding to the plurality of MAC addresses of the remote hosts reachable through the Datacenter Ethernet networking device of the Datacenter Ethernet network;
receive a packet that is directed one of the plurality of remote hosts reachable through the Datacenter Ethernet networking device;
encapsulate the packet with the summarized switch identifier; and
send the packet encapsulated with the summarized switch identifier to the Datacenter Ethernet network for forwarding to the one of the plurality of remote hosts using the summarized switch identifier.

9. The apparatus of claim 8, wherein to generate the summarized switch identifier for the plurality of remote hosts, the processor is configured to:
create an internal port-channel interface for one or more Datacenter Ethernet network networking devices of the Datacenter Ethernet network; and
use the internal port-channel interface to learn the MAC addresses of the plurality of remote hosts.

10. The apparatus of claim 9, wherein the processor is further configured to:
upon receipt of the packet at the Ethernet networking device, encapsulate, based on the internal port-channel interface, the packet with the summarized switch identifier; and
send the packet encapsulated with the summarized switch identifier to a line card of the Datacenter Ethernet networking device in the Datacenter Ethernet network.

11. The apparatus of claim 10, wherein the processor is configured to:
learn the MAC addresses of a plurality of different groups of remote hosts each reachable through a different Datacenter Ethernet networking device of the Datacenter Ethernet network;
generate a summarized switch identifier for each of the different group of remote hosts, wherein each summarized switch identifier corresponds to the plurality of MAC addresses of the remote hosts reachable through the respective different Datacenter Ethernet networking device; and create an internal port-channel interface for each switch identifier in the Datacenter Ethernet network.

12. The apparatus of claim 10, wherein the processor is configured to:

encapsulate the packet with the summarized switch identifier without the use of a proxy forwarding mechanism executed at a Datacenter Ethernet line card that is able to learn the summarized switch identifier.

13. The apparatus of claim 10, wherein the processor is configured to:

send the packet encapsulated with the summarized switch identifier to a line card of a Datacenter Ethernet networking device that does not learn the MAC addresses of the plurality of remote hosts connected behind the Datacenter Ethernet network.

14. One or more non-transitory computer readable storage media encoded with software comprising computer executable instructions and when the software is executed operable to:

at a line card of a Ethernet networking device connected to an edge of a Datacenter Ethernet network, learn the Media Access Control (MAC) addresses of a plurality of remote hosts reachable through a Datacenter Ethernet networking device of the Datacenter Ethernet network;

generate a summarized switch identifier corresponding to the plurality of MAC addresses of the plurality of remote hosts reachable through the Datacenter Ethernet networking device of the Datacenter Ethernet network;

receive a packet at the Ethernet networking device, wherein the packet is directed to a one of the plurality of remote hosts reachable through the Datacenter Ethernet networking device;

encapsulate the packet with the summarized switch identifier; and send the packet encapsulated with the summarized switch identifier to the Datacenter Ethernet network for forwarding to the one of the plurality of remote hosts using the summarized switch identifier.

15. The non-transitory computer readable storage media of claim 14, wherein the instructions operable to generate the summarized switch identifier for the plurality of remote hosts comprise instructions operable to:

create an internal port-channel interface for one or more Datacenter Ethernet network networking devices of the Datacenter Ethernet network; and use the internal port-channel interface to learn the MAC addresses of the plurality of remote hosts.

16. The non-transitory computer readable storage media of claim 15, further comprising instructions operable to:

upon receipt of the packet at the Ethernet networking device, encapsulate, based on the internal port-channel interface, the packet with the summarized switch identifier; and send the packet encapsulated with the summarized switch identifier to a line card of the Datacenter Ethernet networking device in the Datacenter Ethernet network.

17. The non-transitory computer readable storage media of claim 16, further comprising instructions operable to:

learn the MAC addresses of a plurality of different groups of remote hosts each reachable through a different Datacenter Ethernet networking device of the Datacenter Ethernet network;

generate a summarized switch identifier for each of the different group of remote hosts, wherein each summarized switch identifier corresponds to the plurality of MAC addresses of the remote hosts reachable through the respective different Datacenter Ethernet networking device; and create an internal port-channel interface for each summarized switch identifier in the Datacenter Ethernet network.

18. The non-transitory computer readable storage media of claim 14, further comprising instructions operable to:

encapsulate the packet with the summarized switch identifier without the use of a proxy forwarding mechanism executed at a Datacenter Ethernet line card that is able to learn the switch identifier.

19. The non-transitory computer readable storage media of claim 14, further comprising instructions operable to:

send the packet encapsulated with the summarized switch identifier to a line card of the Datacenter Ethernet networking device that does not learn the MAC addresses of the plurality of remote hosts connected behind the Datacenter Ethernet network.

20. The non-transitory computer readable storage media of claim 14, wherein the instructions operable to receive the packet comprise instructions operable to:

receive the packet at a line card that is unable to learn switch identifiers used for forwarding in the Datacenter Ethernet network.

* * * * *

UNITED STATES PATENT AND TRADEMARK OFFICE
CERTIFICATE OF CORRECTION

| | | |
|---|---|---|
| PATENT NO. | : 9,237,098 B2 | Page 1 of 1 |
| APPLICATION NO. | : 13/930126 | |
| DATED | : January 12, 2016 | |
| INVENTOR(S) | : Patel et al. | |

It is certified that error appears in the above-identified patent and that said Letters Patent is hereby corrected as shown below:

On the Title page:

Item (73) Assignee:, replace "Cisco Technologies, Inc." with

-- Cisco Technology, Inc. --.

Signed and Sealed this
Twenty-sixth Day of April, 2016

Michelle K. Lee
*Director of the United States Patent and Trademark Office*